United States Patent
Galeotti et al.

(10) Patent No.: US 6,712,528 B2
(45) Date of Patent: Mar. 30, 2004

(54) OPTICAL BENCH FOR AN OPTO-ELECTRONIC DEVICE

(75) Inventors: Roberto Galeotti, Cremona (IT); Mark Andrew Shaw, Abingdon (GB); Giacomo Coppo, Carate Brianza (IT)

(73) Assignee: Corning O.T.I. S.r.l., Milan (IT)

( * ) Notice: Subject to any disclaimer, the term of this patent is extended or adjusted under 35 U.S.C. 154(b) by 0 days.

(21) Appl. No.: 10/185,839

(22) Filed: Jun. 27, 2002

(65) Prior Publication Data

US 2003/0026557 A1 Feb. 6, 2003

Related U.S. Application Data

(60) Provisional application No. 60/303,039, filed on Jul. 6, 2001.

(51) Int. Cl.[7] ............................. G02B 6/30; G02B 6/26; G02B 6/42; G02B 6/36
(52) U.S. Cl. ............................. 385/91; 385/51; 385/92; 385/49
(58) Field of Search ............................. 385/49, 51, 52, 385/88–89, 91–92

(56) References Cited

U.S. PATENT DOCUMENTS

| | | | |
|---|---|---|---|
| 4,729,623 A | * | 3/1988 | Mery ......................... 385/91 |
| 5,195,102 A | | 3/1993 | McLean et al. |
| 5,570,444 A | | 10/1996 | Janssen et al. |
| 5,930,430 A | | 7/1999 | Pan et al. |
| 5,963,695 A | | 10/1999 | Joyce |
| 6,184,987 B1 | | 2/2001 | Jang et al. |
| 6,207,950 B1 | | 3/2001 | Verdiell |
| 6,227,724 B1 | | 5/2001 | Verdiell |
| 6,443,631 B1 | * | 9/2002 | Case et al. .................. 385/91 |
| 2002/0131729 A1 | * | 9/2002 | Higgins ....................... 385/91 |

FOREIGN PATENT DOCUMENTS

| | | |
|---|---|---|
| EP | 0800243 A2 | 10/1997 |
| FR | 2661005 | 10/1991 |
| WO | WO 97/05513 | 2/1997 |

OTHER PUBLICATIONS

Mostafa Rassaian and Mark Beranek, "Quantitative Characterization of 96.5Sn3.5 Ag and 80Au20Sn Optical Fiber Solder Bond Joints on Silicon Micro–Optical Bench Substrates," IEEE Transactions on Advanced Packaging, vol. 22, No. 1, Feb. 1999, pp. 86–93.

Kamran S. Mobarhan, Ph.D., Soon Jang, and Randy Heyler, "Laser Diode Packaging Technology: 980 nm EDFA Pump Lasers for Telecommunication Applications,"Newport Corporation, Oct. 2000, pp. 1–8.

\* cited by examiner

Primary Examiner—Edward J. Glick
Assistant Examiner—Thomas R Artman
(74) Attorney, Agent, or Firm—Ronald J. Paglierani

(57) ABSTRACT

The invention relates to an optical assembly for opto-electronic packages comprising an optical fibre secured on the underside of an elongated support member in optical alignment with an opto-electronic device, wherein said support member is affixed to an aligning member, which in turn is affixed, e.g., by laser welding, to a welding platform. In a preferred embodiment, the elongated support member is a planar parallelepiped. In a further preferred embodiment, the elongated support member is a parallelepiped with an axially extended slot, in which the optical fibre is secured with its longitudinal axis substantially parallel to the axially extended slot.

20 Claims, 4 Drawing Sheets

OPTICAL BENCH FOR AN OPTO-ELECTRONIC DEVICE

CROSS-REFERENCE TO RELATED APPLICATIONS

This application claims the benefit of priority under 35 U.S.C. §119(e) of U.S. Provisional Application Ser. No. 60/303,039 filed on Jul. 6, 2001.

This application claims the benefit of priority under 35 U.S.C. §119 of European Patent Application Serial No. EP01114842.6 filed on Jun. 28, 2001.

BACKGROUND OF THE INVENTION

1. Field of the Invention

The invention relates to an opto-electronic device module for use in optical telecommunications.

2. Technical Background

In high-power opto-electronic devices, such as laser diodes, the device is generally fixed on a submount made of a material with high thermal conductivity, such as diamond, SiC or AlN. The submount is bonded onto a circuit board, which can accommodate all or part of the complementary internal devices of the laser package, such as a thermistor, a back-field photodetector and circuit patterns.

Optical components for coupling light signals to or from the device, in particular optical fibres and lenses, are fixed in optically aligned position in front of the laser with the help of holding and aligning members (e.g., ferrule, support tube, saddle or clip, or welding blocks). Holding and aligning members and optical components are generally mounted on a base plate, which is also referred to as optical bench. An accurate optical alignment of the optical fibre to the opto-electronic device, e.g., laser, is required in order to maximise the optical coupling efficiency, or, in other words, to maximise the optical output power. For coupling of monomode fibres, submicron fibre alignment tolerances, typically less than about 0.1–0.2 $\mu$m, are necessary. In addition, the alignment ought to be maintained within minimal variations over the course of time and against temperature deviations. Laser welding is the common process of choice for fixing the holding and aligning members. Laser welding occurs by local heating of the joint parts by means of a focussed laser beam. When highly accurate alignment is required, care should be taken in order to minimise post weld shift (PWS) which results from contraction of a cooling laser weld spot. To minimise displacement shifts, optical members and welding platform are generally made of a material with low thermal expansion coefficient. To this purpose, Kovar, stainless steel or Invar are often preferred.

U.S. Pat. No. 6,184,987 describes a process for laser welding a ferrule of a fiber optical cable to a clip of a fiber module. The disclosed process detects and corrects a movement of the fibre optic cable so that alignment is achieved. The process comprises moving a ferrule with an automated device after a weld is completed and then detecting a change in optical power of the light beam that is transmitted through the optical fibre. The detection can determine a direction along which the ferrule shifted during the weld process and subsequent laser welds of the ferrule can correct the shift.

Article 'Laser Diode Packaging Technology: 980 nm EDFA Pump Lasers for Telecommunication Applications' by Mobarhan K. S. and Heyler R., that was available on Oct. 24, 2000, in the Internet at the URL address http://www.newport.com/Support/Application_Notes/APPNOTES3.pdf, describes an optical subassembly that is a miniature aluminium nitride based optical bench containing the laser chip, laser diode submount, photodiode, and various other components. The optical subassembly also includes a relatively large metal platform onto which all the fiber pigtailing components are welded.

In PCT patent application WO 97/05513 a laser diode is placed on a substrate of alumina, which carries also different connections and other electronic components. The circuit board is mounted onto a metallic baseplate, preferably made of an alloy of chromium-nickel, such as Kovar. The aligning and fixing members comprise either an inverted U-shaped member placed on a cylindrical ferrule or a ferrule having two lateral vertical faces. The aligning and fixing members are made of the same material as the baseplate to allow easier laser welding and to minimise the differential expansion between the parts.

U.S. Pat. No. 5,570,444 describes a method of optically coupling optical fibres to injection lasers. A heat-sink carrying a laser diode is mounted on a Kovar substrate. An optical fibre with a lensed end is secured by means of solder to an elongated support member, which has the form of a slotted cylindrical rod. The end of the slotted rod close to the lensed end of the fibre is secured by laser welding to two slide members. The end of the rod remote from the fibre lensed end is secured, always by laser welding, to a plastically deformable saddle.

Article "Quantitative characterization of 96.5Sn3.5Ag and 80Au20Sn optical fiber solder bond joints on silicon micro-optical bench substrates" by Rassain M. and Beranek M. W., published in IEEE Transactions on Advanced Packaging, vol. 22 (1999), pages 86–93, describes stress analyses of optical fibre solder bond joints on silicon substrates under thermal cycle loading for a planar and a V-groove bond joint configuration. Results of stress analyses are reported as a function of the distance between the bottom of the fiber and the silicon substrate.

U.S. Pat. Nos. 6,207,950 and 6,227,724 disclose an opto-electronic package using a flexure to align an optical fibre to an edge-emitting opto-electronic element, such as a laser diode. The fibre is attached on the underside portion of the flexure facing the package substrate. The flexure is attached by laser microwelding to a metallic frame, which is attached to an electrically isolating substrate. The laser diode is mounted on a raised platform (submount) made of a high thermal conductivity material, which is attached on the substrate.

The assembly comprising the optical bench mounting the opto-electronic device, the fibre holding and aligning members, including the fibre, and possibly other complementary internal devices or optical components (e.g., lenses) is generally referred in the art to as the optical assembly. The optical assembly can be placed on a thermoelectric cooler (TEC) or on a heat-sink in order to stabilise the laser temperature during operation. The heat produced by the laser spreads through the submount and the optical bench to finally reach the TEC surface. Applicants have found that isotropically uniform thermal diffusion is at least partially inhibited when the laser is placed on a submount, even when the submount is made of a material with high thermal conductivity. They have further observed that thermal resistance of the optical assembly increases with the thickness of the submount.

The optical assembly is generally housed in a hermetically sealed package including a metallic box provided with input/output electrical leads. Presently, 14-pin butterfly packages have become standardised throughout the industry for laser packaging, e.g., for 980 nm pump laser devices or 920 nm multimode lasers for fibre lasers or Raman amplifiers, since they enable customers to source from more than one supplier. These standard packages are usually provided with a nose tube (snout) mounted at the exterior of a package wall, which surrounds a hole in the wall for the insertion of the fibre ending portion into the package. The operation of inserting the fibre through the snout generally takes place after the fibre ending portion has been secured, e.g., soldered, into a support member. Insertion can occur with the help of a fibre loader probe assembly or of a grip assembly, e.g., tweezers. Applicants have observed that handling with a gripping mechanism the support member during insertion of the fibre in the package can lead to the fibre breakage when the fibre is secured in a slotted rod with the fibre facing upwards.

SUMMARY OF THE INVENTION

The invention relates, in a first aspect, to an optical assembly for opto-electronic packages comprising an optical fibre secured on the underside of an elongated support member in optical alignment with an opto-electronic device, wherein said support member is affixed to an aligning member, which in turn is affixed to a welding platform. Preferably, the elongated support has a length-to-width ratio not smaller than 1.5, more preferably not smaller than 3. In a preferred embodiment, the elongated support member extends in a direction substantially perpendicular to the upper surface of the substrate by not more than 50 $\mu$m beyond the surrounding surface of the fibre.

One of the advantages of the present invention is that the fibre is permanently secured on the underside of a support member that can be aligned in 3D (e.g., x-y-z alignment) before being fixed, e.g., by laser welding, to the aligning member and hence to the welding platform.

In particular the invention relates an optical assembly for opto-electronic packages comprising:

a substrate having an upper surface;

an optical fibre having a longitudinal axis;

an opto-electronic device which is mounted on a first portion of the substrate upper surface and which is optically coupled with said optical fibre;

at least a welding platform placed on a second portion of the substrate upper surface;

at least an aligning member comprising at least a surface for being affixed to the welding platform and an aligning surface;

an elongated support member holding the optical fibre in optical coupling with the opto-electronic device, said elongated support member having at least an aligning surface contacting the aligning surface of the aligning member, the two aligning surfaces being shaped so as to allow relative movement of the aligning member and the elongated support member during an alignment phase, said elongated support member being affixed to the aligning member after the aligning phase, wherein the optical fibre comprises an ending portion which is secured on the underside of said elongated support member facing the upper surface of the substrate.

In a preferred embodiment, the elongated support member is a planar parallelepiped. In a further preferred embodiment, the elongated support member is a parallelepiped with an axially extended slot, in which the optical fiber is secured with its longitudinal axis substantially parallel to the axially extended slot.

The substrate mounting the opto-electronic device and the welding platform, i.e., the optical bench, is preferably made by a material having thermal conductivity not less than 140 W/mK. Applicants have observed that thermal properties of the package are sensibly improved when the thickness of the submount for the opto-electronic device is reduced to a height smaller than 0.2 mm. Applicants have also found that thermal resistance of the package can be minimised when the laser is mounted directly on the surface of a highly thermally conductive optical bench.

The optical assembly is suitable for being housed in an opto-electronic package, for example a 14-pin butterfly package or a dual in-line package. The optical assembly is particularly suitable for being housed in a thermally controlled opto-electronic package, which includes a cooler, such as a heat-sink or a thermoelectric cooler (TEC).

The invention relates also to method of optically coupling an optical fibre with an opto-electronic device, wherein said optical fibre has a longitudinal axis and comprises an ending portion, and said opto-electronic device is housed in a package housing provided with a hole in one of its walls, said method comprising the steps of:

positioning the optical fibre ending portion on a surface of an elongated support member so that the longitudinal axis of the fibre is placed along the direction of elongation of the support member;

permanently securing the optical fibre on the support member surface;

turning the support member with the permanently secured fibre so that the fibre is positioned on the underside of the support member;

feeding the support member axially through the hole in the wall of the package housing, and aligning the optical fibre with the opto-electronic device and affixing it to the package in an aligned position.

Applicants have found that by handling the support member with the fibre secured on its underside, the risk of levering off the fibre from the support member is substantially avoided, thereby reducing the risk of fibre breakage.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Without any loss of generality of applicability for the principles of the invention, the embodiments below are directed to a laser module, with particular reference to a 980 nm pump laser devices or to 920 nm multimode lasers for pumping fibre lasers or Raman amplifiers. It should however be understood that the present invention applies also to any opto-electronic device, such as an optical receiver or a light-emitting diode, which is optically coupled to an optical fibre.

Figure 1:
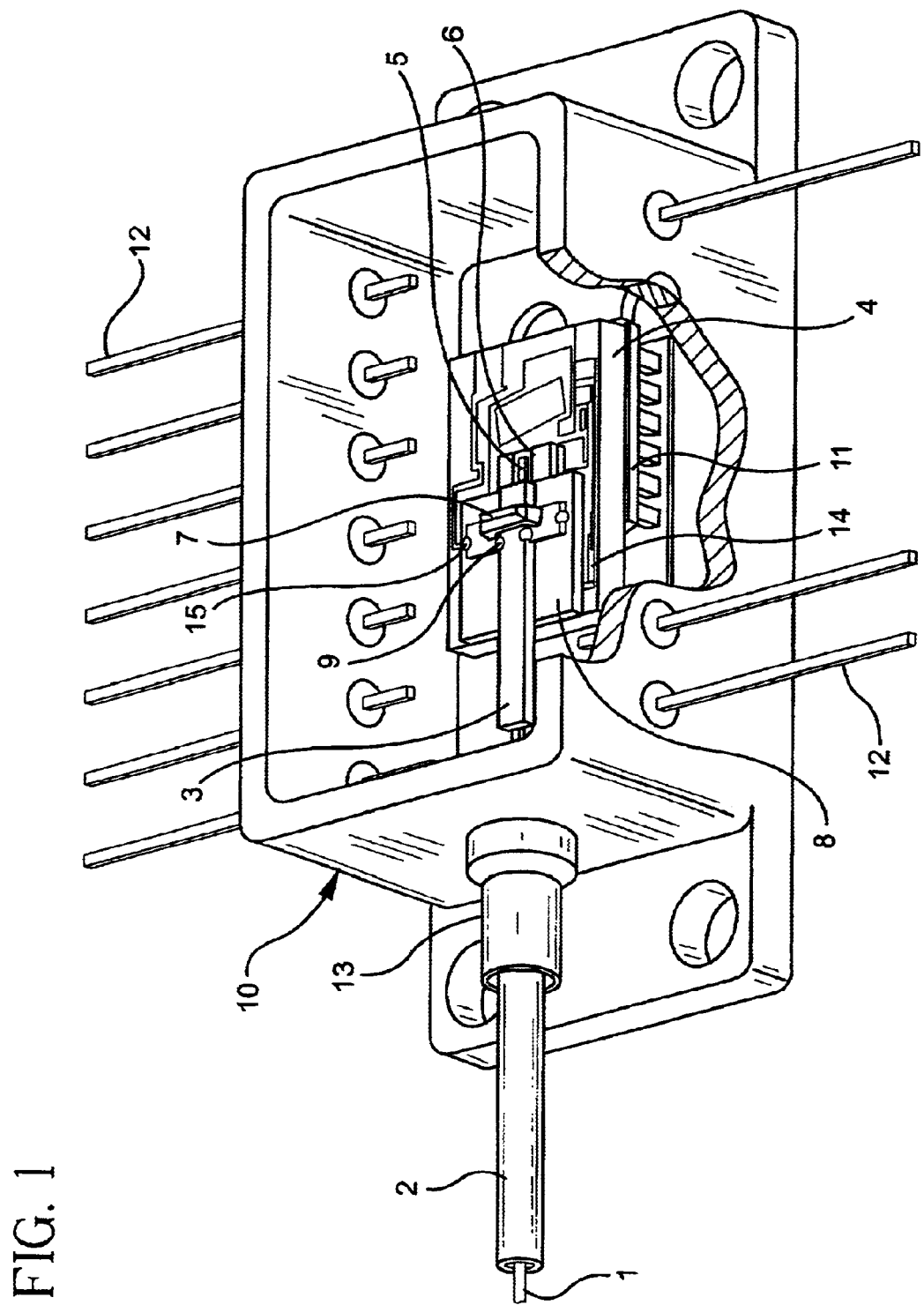
FIG. 1 is a perspective view of an opto-electronic package housing an optical assembly according to a first embodiment of the invention.
Figure 2:
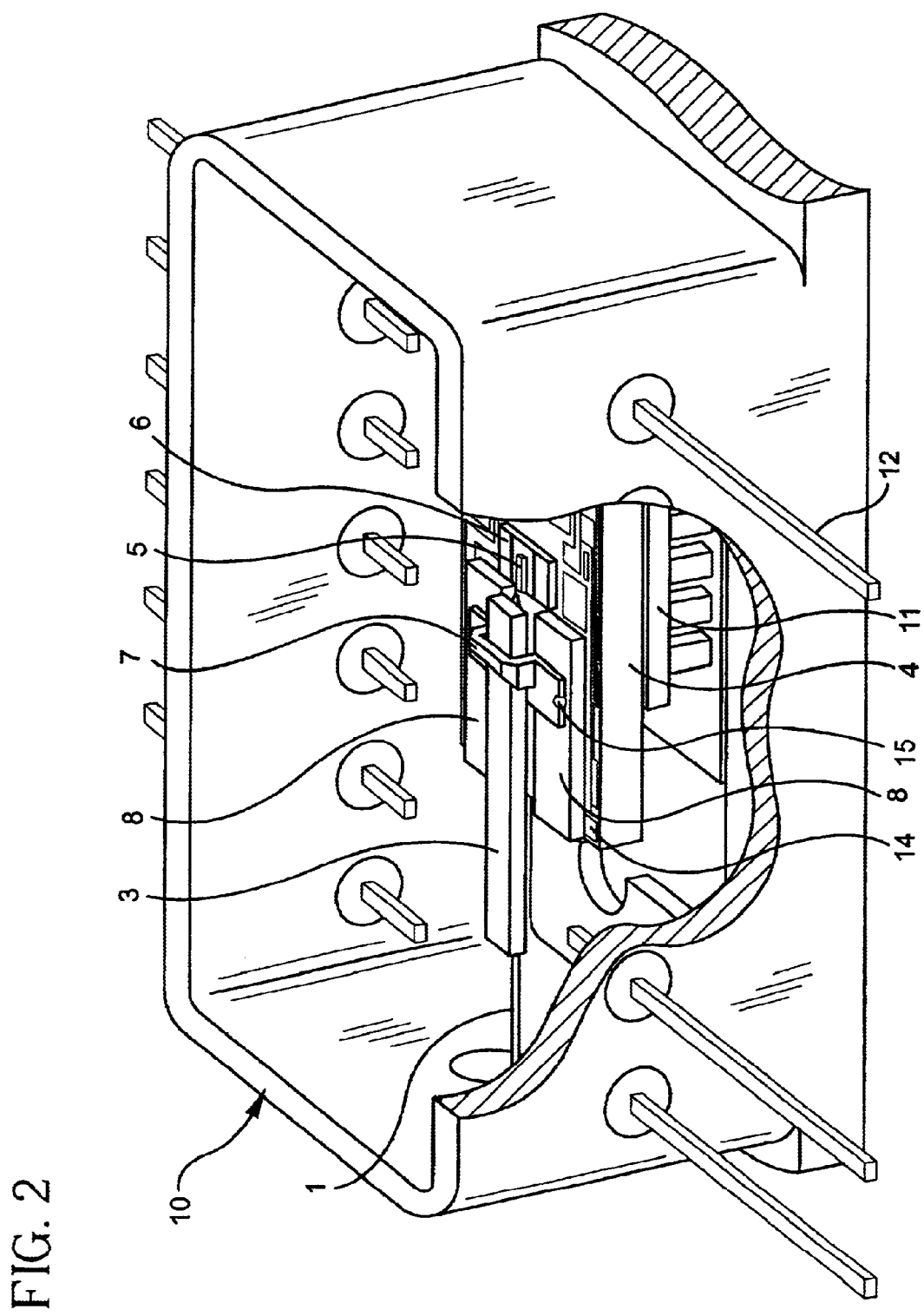
FIG. 2 is a partial perspective view of the package of FIG. 1.

FIGS. 1 and 2 show respectively a perspective view and a partial perspective view (taken from a different angle) of a package 10, for example a 14-pin butterfly package, housing an optical bench 4, which is soldered or glued to a TEC 11, in this case a Peltier-element electronic cooler. Alternatively, a heat-sink can be used as cooler in place of a TEC. Package 10 comprises a metallic housing provided with terminal pins 12 that extend from the side surfaces of the package. A laser unit 5 (e.g., a laser diode chip) is placed on a submount 6, which is mounted on the optical bench 4. Submount 6 mounting the laser is preferably of a thermally conductive material, such as diamond, SiC, AlN or BN. Optical fibre 1 is hermetically soldered along its longitudinal axis in a metallic tube, e.g., a cylindrical ferrule 2, which extends through a hole in the package wall to the exterior of the package housing. The ferrule 2 is soldered by a hermetic sealant in a protective snout 13, which is mounted at the exterior of the package and which surrounds the hole for allowing the passage of the fibre. Inside the package, the ending portion of the optical fibre is placed in front of the laser emitting area, with its tip placed near the laser output region. The fibre ending portion is permanently secured longitudinally on the underside of an elongated support member 3, along the length of said support member. A microlens can be formed on or mounted at the fibre tip so as to maximise coupling from the laser. Alternatively, a lens, such as a graded index lens, can be placed between the fibre and the laser, always to improve optical coupling.

The support member 3 has a shape of an elongated parallelepiped and is made of any material that allows laser welding, e.g., a material with low thermal expansion coefficient such as Kovar. Examples of alternative materials for the support member are Invar or stainless steel. The optical fibre end portion is permanently secured on the lower surface, i.e., that facing the upper surface of optical bench 4, of the support member 3. The support member 3 is fixed to an aligning member 7, in the example shown in FIGS. 1 and 2 a clip, by laser welding, for example with two laser weld spots 9. The aligning member 7 is laser welded, for example with weld spots 15, to the welding platform 8, illustrated in FIGS. 1 and 2 as two spaced-apart slabs. Welding platform 8 and aligning member 7 can be made, for example, of any material that allows laser welding, such as Kovar. Although a clip is shown in FIGS. 1 and 2 as aligning member, it is to be understood that different designs of aligning member or members can be contemplated depending on the aligning method for the fibre-laser optical coupling that will be used. An alternative design for the aligning member may comprise, for instance, a pair of welding blocks that are welded to the welding platform and to which the support member can be welded. Furthermore, the welding platform may have different shapes, always depending on the aligning method, such as two blocks provided with recesses or shoulders for fitting one or more aligning members, a U-shaped platform, or an assembly comprising more than one pair of welding blocks to be welded to more than one aligning member.

Figure 3:
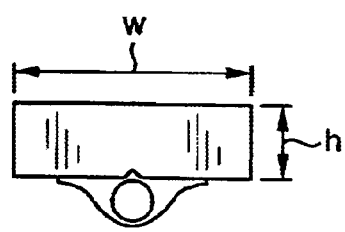
FIG. 3 is a cross-sectional view of the fibre support member according to a first embodiment of the invention.

FIG. 3 is a cross-sectional view of the support member 3 according to a first embodiment and illustrated in FIGS. 1 and 2. The support member 3 has a rectangular cross-section and can be provided with a groove on its lower surface so as to ease positioning and fixing of the fibre. The fibre can be soldered to the support member 3 by using a metallic solder, for example an AuSn alloy, or a glass solder 16. For soldering by using a metallic solder, it is necessary to metallise the portion of the fibre to be soldered. The cross-sectional dimensions of the support member 3 are chosen according to the design of the optical bench, the structure of the aligning-positioning members (e.g., welding platform, clip) and to the fixing process. When the support member is fixed to the aligning-positioning members by laser welding, a general requirement for the support member dimensions is that its height h and its width w (FIG. 3) should be large enough to allow accurate laser welding without damaging the optical fibre. The cross-sectional dimensions (h and w) should thus be chosen in dependence of the welding laser operating conditions (e.g., laser power, pulsing time, laser beam focus, etc.), which determine the welding spot dimensions. In the example shown in FIGS. 1 and 2, the support member is welded to clip 7 by two weld spots 9. Exemplary dimensions of the support member and the welding spots are as follows: weld spot depth of 200 $\mu$m, weld spot diameter of 400 $\mu$m, height h of the support member of at least about 300 $\mu$m and width w of at least about 1 mm.

The fibre support member is elongated so as to enable its insertion in standard opto-electronic packages, such as butterfly or dual-in-line packages, and to facilitate its handling during alignment. Preferably, the support member has length-to-width ratio not smaller than about 1.5, more preferably not smaller than about 3. The parallelepiped shape of the support member 3 has the advantageous welding geometry given by sharp corners, in this case the contact surfaces of the support member and the clip. Further, support member 3 has a planar geometry of the surface to which the fibre is secured. That surface can be provided with a groove or can be fully planar (i.e., without groove). The fibre end can be permanently secured to the support member by bonding or soldering. Soldering is commonly preferred to bonding with an adhesive since adhesive contains organic components that may contaminate the elements of the package. Because soldering is done at relatively high temperatures and because the coefficient of thermal expansion (contraction) of the glass is generally considerably smaller than that of the support member, the fibre ending portion experiences both thermal and mechanical stresses when the solder is cooled down. Furthermore, the fibre can undergo thermomechanical stresses induced by the temperature variations inside the package during operation. A planar geometry for the support member is advantageous because stresses in the fibre are minimised, as the solder is not constrained in space, but can freely expand during melting and solidification. Preferably, the (bare) fibre is bonded to the support member by using a glass solder having a melting temperature lower than about 400° C.

Figure 4:
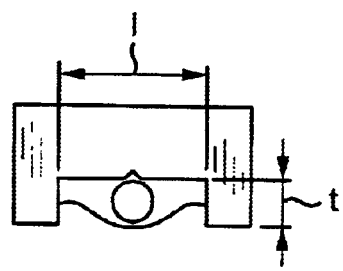
FIG. 4 is a cross-sectional view of the fibre support member according to a second embodiment of the invention.

FIG. 4 shows a support member for the ending portion of the optical fibre according to a second embodiment. Support member 40 has a shape of a slotted parallelepiped with a slot having a depth t and a width l. The optical fibre 1 is soldered near its tip in the slot by means of solder 16. During soldering, lateral walls of the slot confine the solder. Preferably, the slot depth t does not exceed the fibre diameter d by more than about 50 μm. A small slot depth is preferred because it makes the mounting of the fibre at a relatively short distance from the bench surface possible. Preferably, the support member according to this second embodiment has sharp (e.g., 90°) corners so that laser welding operation is facilitated. The support member 40 is positioned on the optical bench with the slot facing downwards, i.e., with the fibre facing the upper surface of the optical bench. Preferably, the slot width l is chosen so as to reduce thermo-mechanical stresses in the fibre. Table I reports the results of a 3D finite-element model applied for analysing the soldering of a fibre end to a Kovar support member with different designs. Von Mises stresses on the fiber after cooling down of the solder are reported for glass solder having melting temperature of about 360° C. and for 80Au20Sn alloy (melting temperature of about 280° C.) and for different shapes of the support member: a planar parallelepiped (FIG. 3) and a slotted parallelepiped (FIG. 4). Results show that the slot width l should be preferably larger than 0.2 mm so as to avoid the fibre experiencing a relatively high stress after soldering.

TABLE I

| Support member | Solder material | Stress on the fibre (N/mm$^2$) |
| --- | --- | --- |
| Planar parallelepiped | glass | 129 |
| Planar parallelepiped | AuSn | 325 |
| Slotted parallelepiped l = 0.6 mm | glass | 129 |
| Slotted parallelepiped l = 0.6 mm | AuSn | 314 |
| Slotted parallelepiped l = 0.4 mm | glass | 129 |
| Slotted parallelepiped l = 0.4 mm | AuSn | 317 |
| Slotted parallelepiped l = 0.2 mm | glass | 140 |
| Slotted parallelepiped l = 0.2 mm | AuSn | 344 |

Further alternative designs could be contemplated for the elongated support member with the scope of the invention, e.g., a trapezoidal shape of the support member cross-section.

Figure 5A:
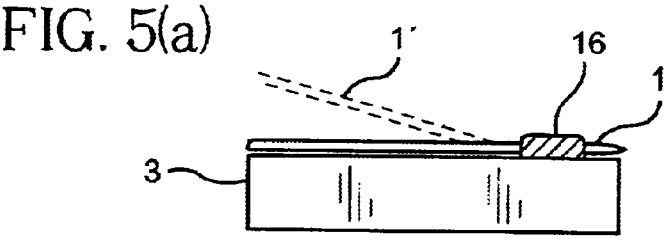
FIG. 5(a) illustrates an example of a fibre secured on the upper surface of an elongated support member.
Figure 5B:
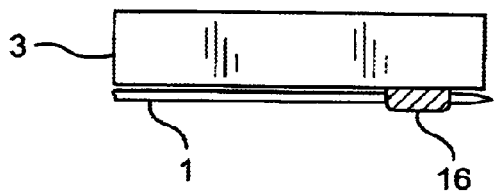
FIG. 5(b) illustrates an example of a fibre secured on the lower surface of an elongated support member according to the invention.

An advantage of the present invention is that mounting the fibre on the underside of the support member drastically reduces the risk of fibre rupture during handling, especially during insertion of the fibre in the package. Referring to FIG. 1, the fibre 1, which is soldered to the support member 3, needs to pass through snout 13 to be positioned in front of the laser. Applicants have found that if the fibre is facing up during handling, as shown in FIG. 5(*a*), the fibre is subjected to a tensile force as the support member 3 tends to hang down because of gravity. The fibre then tends to lever off, as illustrated in FIG. 5(*a*) with dashed lines 1', and consequently to break. Correct handling is particularly difficult when the fibre is soldered to the support member for a length portion relatively small compared to the length of the support member. In the example shown in FIG. 1, the length of the support member 3 is of about 7 mm and the soldered portion 16 is of about 1 mm. When the support is handled with the fibre facing downwards, as in the present invention, the support can only rest on the fibre and the gravity force will tend only to push the fibre into the support instead of levering it off. Therefore, fibre breakage is substantially avoided. It should be noted that in a package comprising a feed-through, such as a snout 13 as that shown in FIG. 1, the operation of inserting the support member having the fibre secured on its underside portion and then turning the support member in its upward position is difficult and risky. This is particularly true when the fibre is mounted in two supporting structures as in the present example: a feed-through tube (e.g., ferrule) and a support member for the fibre ending portion. In order to place the support member on the optical bench with the fibre upward, both the support member and the tube should integrally rotate of 180° C.

Previous discussion naturally extends also to support members comprising a slot, as that shown in FIG. 4.

The optical bench on which the laser unit and the positioning-aligning members are mounted is preferably made of an electrically insulating material having a high thermal conductivity, such as a ceramic material. A high thermal conductivity is desirable to improve heat dissipation, so that, during laser operation, heat can spread radially from the submount to the ceramic bench and then to the TEC top surface. Preferably, the optical bench substrate is made of AlN based material. Herein, AlN based materials means, besides pure AlN, ceramic composites or physical mixtures containing AlN. Examples of AlN based materials are given in U.S. Pat. Nos. 5,102,749 and 5,133,403. Other possible choices of thermally conductive materials for the substrate could be beryllium oxide (BeO) or translucent cubic boron nitride (T c-BN). Non ceramic materials, such as thermoset resins, can be also used, unless organic materials are to be avoided to prevent contamination of the devices in the package. In selecting the material for the optical bench substrate a major requirement is a thermal conductivity sufficiently high for efficient power dissipation. Preferably, thermal conductivity of the optical bench substrate should be larger than or equal to 140 W/mK.

In the example shown in FIGS. 1 and 2, the optical bench 4 is made of a single electrically insulating substrate, such as AlN. A single substrate combines the function of being a rigid support for the optical members with the function of the circuit board. Preferably, the optical bench 4 of FIGS. 1 and 2 is provided with peripheral metallised tracks 14, which extend over at least part of the bench surface in a direction substantially parallel to the optical fibre longitudinal axis. In a preferred embodiment, metallized tracks 14 extend over an area of the bench 4, said area being elongated substantially along the longitudinal axis of the optical fibre on one side or on both sides of the area reserved for mounting the welding platform 8. In this preferred embodiment, optical bench 4 therefore functions both as optical bench and as circuit board. Metallized tracks 14 can thus lead from terminal pads on the bench surface to any corresponding terminal pin 12 in the package, thereby avoiding the presence of long electrical connections, wires or the like (electrical connections from the optical bench to the external pins not shown in FIGS. 1 and 2), as described in greater detail in patent application EP001285964 by the same applicant. In the package shown in FIGS. 1 and 2, straight external pins extend through the apertures of the side walls of the package. Hermetic sealing, generally using glass or ceramic material, around the pins provides the means for sealing the pins to the package. Optical bench 4 is suitable also for butterfly or dual-in-line packages provided with ceramic terminal feed-through's of the type described for example in U.S. Pat. Nos. 5,963,695, 5,930,430, and 5,195,102.

A further advantage of the present invention is that mounting the fibre on the lower surface of the support member reduces the distance between the fibre and the top surface of the optical bench. In this way, it is possible to reduce the height at which the laser unit is placed with respect to the optical bench upper surface. The minimum distance between the fibre and the optical bench surface can be taken as the radius of the fibre. If the diameter of the uncoated fibre is of about 125 μm, the minimum distance is of about 62.5 μm. In practice, a slightly higher value for the distance is used in order to avoid the fibre to be subject to the stresses the other components of the optical bench may undergo and to ensure a 3D fibre-laser alignment (e.g., x-y-z alignment).

When the laser is mounted on a submount that is itself mounted on the optical bench, heat transfer occurs across the submount and the ceramic optical bench. This, at least partially, inhibits isotropic uniformity in thermal diffusion of the heat from the laser. Accordingly, the thickness if the submount is advantageously small. Furthermore, it is advantageous to reduce the thickness of the submount so that thermal resistance from the laser to the TEC surface is reduced.

As an example of the influence of the package design on thermal resistance, the following table, Table II, shows the results of thermal simulations for lasers in a standard 14-pin butterfly package housing an optical bench comprising a single AlN substrate with thickness of 1.8 mm. Table II reports the temperature gradient between the laser diode chip and the package and thermal resistance of the package, referring to a package design housing an optical assembly of the type shown in FIGS. 1 and 2. Values are given in Table II for two laser configurations. The first configuration relates to a 980 nm GaAs laser diode chip with p-side up junction operating with a optical power of about 450 mW and a dissipated thermal power of 300 mW. The second one relates to a 980 nm GaAs laser diode chip with p-side down junction, also operating with a power of about 450 mW and a dissipated thermal power of 300 mW. In both cases, the optical power coupled to the fibre is of about 350 mW.

TABLE II

| Laser | Submount | ΔT chip-package (° C.) | Thermal R (° C./W) |
|---|---|---|---|
| p-side up chip | 0.6 mm SiC submount | 10.60 | 35.3 |
| p-side up chip | 0.2 mm SiC submount | 10.57 | 35.2 |
| p-side up chip | No submount | 4.26 | 14.2 |
| p-side down chip | 0.6 mm SiC submount | 4.19 | 14.0 |
| p-side down chip | 0.2 mm SiC submount | 4.16 | 13.9 |
| p-side down chip | No submount | 2.90 | 9.6 |

In the p-side down junction configuration, the active layer of the laser is located closer to the TEC surface, thereby further improving heat dissipation. The p-side down laser is preferably positioned on a submount with thickness of at least the fibre radius, so as to avoid placing the fibre support member too close or in contact to the optical bench surface, thereby limiting the possibility of a 3D alignment. As shown in Table II, thermal resistance of the package is improved by reducing the thickness of the submount. Generally, for a p-side up laser chip, mounting the laser directly on the bench surface leads to a reduction of the thermal resistance of 60% with respect to the design having a p-side up laser mounted on a 0.6 mm-thick submount. As shown in Table II, thermal resistance progressively but non-linearly decreases with the decrease of the submount thickness. Minimum thermal resistance is obtained by mounting the laser chip directly on the optical bench surface. Applicants would like to remark that a decrease in thermal resistance as small as a degree per watt (or even less) is significant in terms of reliability and life-time of the opto-electronic package.

Although examples are made for two specific laser chips, relative results and discussions extend to any laser diode chip having p-side up or p-side down configurations. The different laser designs that can be used in the present invention are well known in the art and will not be elaborated upon further in this disclosure.

Figure 6:
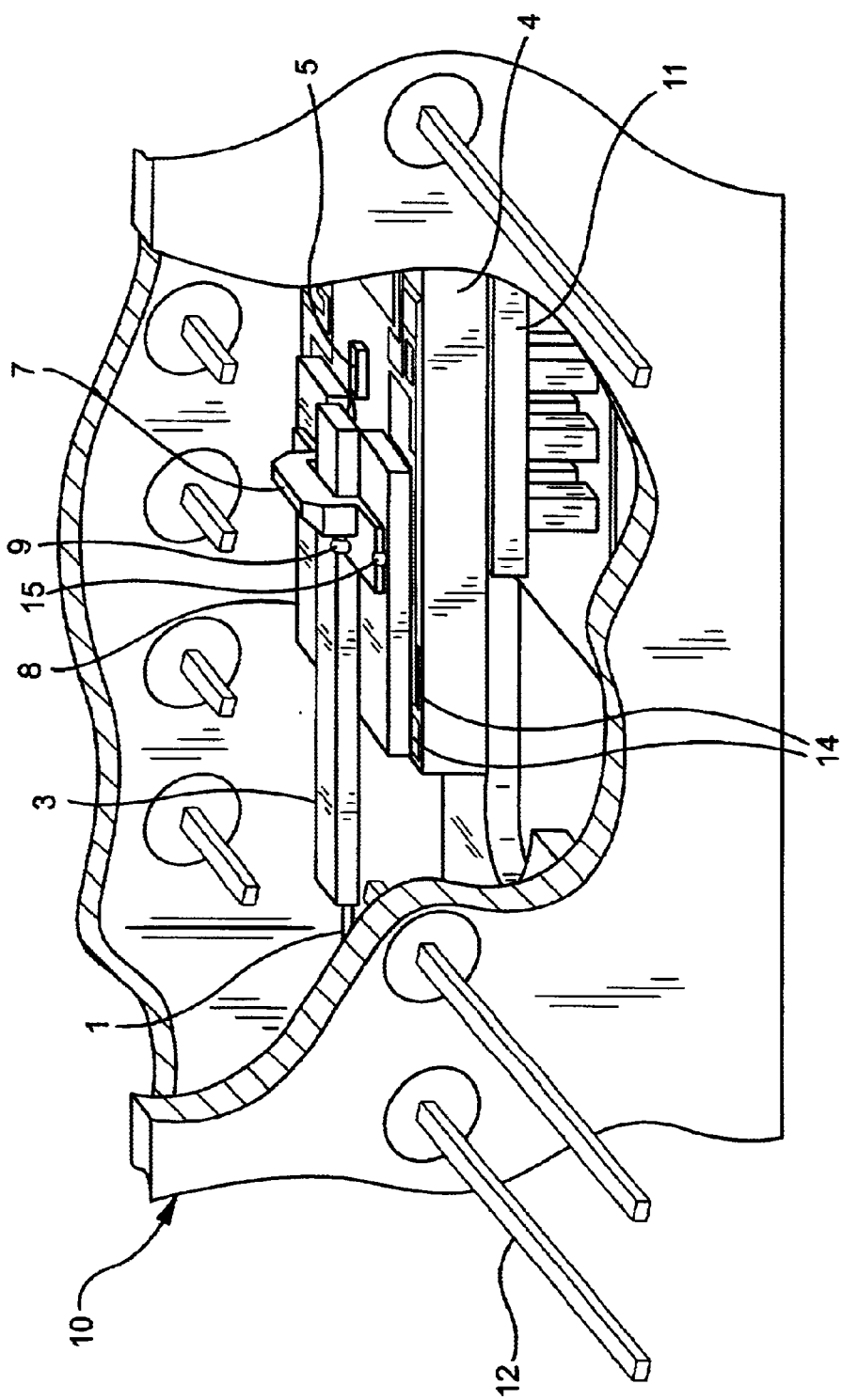
FIG. 6 is a partial perspective view of the package housing an optical assembly according to a further embodiment of the invention.

A further embodiment of the present invention, in which the laser unit is mounted directly on the optical bench, i.e., without interposing a submount between the laser unit and the optical bench, is illustrated in FIG. 6. Laser unit 5 is directly mounted on the optical bench 4. As an example of carrying out this further embodiment of the invention, a p-side up laser chip having a light-emitting area at a height of 0.14 mm from the chip bottom surface was placed directly on the optical bench upper surface. The fibre ending portion was soldered on the underside of a planar parallelepiped support member by means of glass solder. Exemplary dimensions of the planar parallelepiped support member were as follows: height h of about 300 μm, width w of about 1 mm and length of about 7 mm. The support member in the example was made of Kovar. The fibre core was positioned in optical coupling with the laser at a perpendicular distance of about 0.14 mm from the optical bench surface. The fiber was then actively aligned in x-, y- and z-directions by maximising the optical output power. The support member was finally fixed by laser welding to the aligning member, which had been affixed to welding platform also by laser welding.

By placing the laser directly on the bench surface, heat spreading from the laser to the TEC surface follows a relatively short thermal path, i.e., only through the optical bench, thereby decreasing the thermal resistance. This improves the TEC cooling efficiency with consequent decrease in power consumption of the package.

As a further example of carrying out the invention, a p-side down laser chip having a light-emitting area at a height of about 0 mm relative to the chip bottom surface was placed on a submount of AlN of 0.16 mm. Support member and alignment design was the same as that described in the previous example. The fibre core was then positioned in optical coupling with the laser at a distance of about 0.16 mm from the optical bench surface. Although placing the p-side down laser chip directly on the optical bench surface is thermally advantageous, in practice this configuration would require to place the fibre core at the height of the optical bench upper surface, which is of course not possible unless a recess is formed on the optical bench substrate. The recess would however worsen uniform thermal diffusion, therefore a p-side down laser is preferably placed on a submount of reduced thickness, preferably less than 0.2 mm. As a thin submount reduces the thermal path between the laser and the TEC surface, thermal resistance of the package is reduced.

The above detailed description is only illustrative of the invention, which is not restricted to the preferred embodiments. Modifications will be obvious to those with skill in the art and will not depart from the scope of the invention as it is defined by the following claims.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical assembly for opto-electronic packages comprising:
- a substrate having an upper surface;
- an optical fibre having a longitudinal axis;
- an opto-electronic device which is mounted on a first portion of the substrate upper surface and which is optically coupled with said optical fibre;
- at least a welding platform placed on a second portion of the substrate upper surface;
- at least an aligning member comprising at least a surface for being affixed to the welding platform and an aligning surface;
- an elongated support member holding the optical fibre in optical coupling with the opto-electronic device, said elongated support member having at least an aligning surface contacting the aligning surface of the aligning member, the two aligning surfaces being shaped so as to allow relative movement of the aligning member and the elongated support member during an alignment phase, said elongated support member being affixed to the aligning member after the aligning phase,
- wherein the optical fibre comprises an ending portion which is secured on the underside of said elongated support member facing the upper surface of the substrate.

2. The optical assembly according to claim 1, wherein the elongated support member extends in a direction substantially perpendicular to the upper surface of the substrate by not more than 50 µm beyond the surrounding surface of the fibre.

3. The optical assembly of claim 1, wherein the elongated support member has a length to width ratio greater than or equal to 1.5, said length being defined along the longitudinal axis of the optical fibre.

4. The optical assembly of claim 3, wherein the elongated support member has a length to width ratio greater than or equal to 3.

5. The optical assembly of claim 1, wherein the elongated support member is a planar parallelepiped.

6. The optical assembly of claim 1, wherein the elongated support member is a parallelepiped with an axially extended slot, in which the optical fiber is secured with its longitudinal axis substantially parallel to the axially extended slot.

7. The optical assembly of claim 6, wherein the slot width of the elongated support member is larger than 0.2 mm.

8. The optical assembly of claim 1, wherein the opto-electronic device is directly mounted on the substrate upper surface.

9. The optical assembly of claim 1, wherein the opto-electronic device is affixed on a submount which is affixed on the substrate upper surface, said submount having a thickness of less than 0.2 mm.

10. The optical assembly of claim 1, wherein the substrate is made of a material with thermal conductivity greater than or equal to 140 W/mK.

11. The optical assembly of claim 10, wherein the substrate is made of an aluminium nitride based material.

12. The optical assembly of claim 1, wherein said opto-electronic device is a laser diode chip.

13. An opto-electronic package housing an optical assembly according to claim 1.

14. An opto-electronic package according to claim 13, wherein the package comprises:
- a housing having a plurality of walls for enclosing said optical assembly;
- a hole in one of the side walls of said housing for the insertion of the fibre in the package, and
- a cooler coupled to said substrate and to said housing.

15. An opto-electronic package according to claim 14, wherein said cooler is a thermoelectric cooler.

16. A method of optically coupling an optical fibre with an opto-electronic device, wherein said optical fibre has a longitudinal axis and comprises an ending portion, and said opto-electronic device is housed in a package housing provided with a hole in one of its walls, said method comprising the steps of:
- positioning the optical fibre ending portion on a surface of an elongated support member so that the longitudinal axis of the fibre is placed along the direction of elongation of the support member;
- permanently securing the optical fibre on the support member surface;
- turning the support member with the permanently secured fibre so that the fibre is positioned on the underside of the support member;
- feeding the support member axially through the hole in the wall of the package housing, and
- aligning the optical fibre with the opto-electronic device and affixing it to the package in an aligned position.

17. A method according to claim 16, wherein the step of affixing the optical fibre in optical coupling with the opto-electronic device is made by laser welding.

18. A method according to claim 16, wherein the step of permanently securing the optical fibre on the support member is made by soldering.

19. A method according to claim 16, further comprising, before the step of positioning the fibre on a surface of the elongated support member, the steps of:
- inserting the optical fibre in a metallic tube provided with a bore so as leave an ending portion of fiber projecting from the bore, said metallic tube being adapted to being fixed in the hole of the package housing wall, and
- permanently securing the optical fibre in the bore of the metallic tube.

20. A method according to claim 19, further comprising the step of affixing the metallic tube to the hole in the package wall by an hermetic sealant.

* * * * *